United States Patent
Fang et al.

(10) Patent No.: US 10,289,311 B2
(45) Date of Patent: *May 14, 2019

(54) ALLOCATING STORAGE EXTENTS IN A STORAGE SYSTEM

(71) Applicant: INTERNATIONAL BUSINESS MACHINES CORPORATION, Armonk, NY (US)

(72) Inventors: Liang Fang, Shanghai (CN); Shiwen He, Shanghai (CN); Jun Liao, Shanghai (CN); Jun Wei Zhang, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/954,797

(22) Filed: Apr. 17, 2018

(65) Prior Publication Data
US 2018/0232158 A1 Aug. 16, 2018

Related U.S. Application Data

(63) Continuation of application No. 14/698,969, filed on Apr. 29, 2015, now Pat. No. 9,983,802.

(51) Int. Cl.
*G06F 3/06* (2006.01)
(52) U.S. Cl.
CPC .......... *G06F 3/0611* (2013.01); *G06F 3/067* (2013.01); *G06F 3/0631* (2013.01);
(Continued)

(58) Field of Classification Search
CPC .... G06F 3/0611; G06F 3/0631; G06F 3/0665; G06F 3/0604; G06F 2209/5019
See application file for complete search history.

(56) References Cited

U.S. PATENT DOCUMENTS

| 7,949,847 B2 | 5/2011 | Murase |
| 8,001,327 B2 | 8/2011 | Mimatsu |

(Continued)

OTHER PUBLICATIONS

IBM: List of IBM Patents or Patent Applications Treated As Related (Appendix P), Apr. 24, 2018, pp. 1-2.

(Continued)

*Primary Examiner* — Ann J Lo
*Assistant Examiner* — Masud K Khan
(74) *Attorney, Agent, or Firm* — Michael O'Keefe

(57) ABSTRACT

Embodiments of the present invention provide a method, system, and computer program product for allocating storage extents. Extent input/output information pertaining to an extent on a storage device is received, by a computer, where the extant input/output information includes an access rate of data stored on the extent. The computer determines one or more periods of time where the input/output information exceeds a preconfigured threshold. The computer generates one or more of a first policy and a second policy based on the determined one or more periods where the first policy includes allocating the extent to a high performance disk within a tier storage system when data is stored during the determined periods and the second policy includes reallocating the extent from a low performance disk within the tier storage system to a high performance storage device within the tier storage system during the one or more determined periods.

20 Claims, 3 Drawing Sheets

(52) U.S. Cl.
CPC .......... *G06F 3/0649* (2013.01); *G06F 3/0665* (2013.01); *G06F 3/0685* (2013.01); *G06F 3/0604* (2013.01); *G06F 3/0605* (2013.01); *G06F 3/0647* (2013.01); *G06F 2209/5019* (2013.01)

(56) References Cited

U.S. PATENT DOCUMENTS

| | | |
|---|---|---|
| 8,635,422 B1 | 1/2014 | Kaliannan et al. |
| 8,706,962 B2 | 4/2014 | Belluomini et al. |
| 8,782,324 B1 | 7/2014 | Chen et al. |
| 9,239,786 B2 | 1/2016 | Ki et al. |
| 2006/0085836 A1 | 4/2006 | Lyons, Jr. et al. |
| 2008/0091748 A1 | 4/2008 | Beniyama et al. |
| 2008/0168228 A1 | 7/2008 | Carr et al. |
| 2008/0285465 A1 | 11/2008 | Yang |
| 2011/0185120 A1 | 7/2011 | Jess |
| 2012/0191881 A1 | 7/2012 | Uchi et al. |
| 2012/0278512 A1 | 11/2012 | Alatorre et al. |
| 2014/0068221 A1 | 3/2014 | Feng et al. |
| 2015/0106565 A1 | 4/2015 | Ayukawa et al. |
| 2015/0269000 A1 | 9/2015 | Alexeev et al. |

OTHER PUBLICATIONS

Zhang et al., "Automated Lookahead Data Migration in SSD-enabled Multi-tiered Storage Systems", Proceedings of the 26th IEEE Symposium on Massive Storage Systems and Technologies (MSST2010), Nevada, USA, May 3-7, 2010, 6 pages.

Fang et al., Pending U.S. Appl. No. 14/698,969, titled "Allocating Storage Extents in a Storage System", filed Apr. 29, 2015, pp. 1-34.

ALLOCATING STORAGE EXTENTS IN A STORAGE SYSTEM

FIELD OF INVENTION

The present invention relates generally to the field of computing, and more particularly to storage extent allocation.

BACKGROUND

Data storage may be classified as either hot data storage or cold data storage. Hot data, or active data, may relate to frequently accessed data or data with a high input/output (I/O) ratio. For example, hot data may be stored data that needs to be quickly accessed in order to make an informed decision. Hot data may reside on a high performance storage environment, such as flash storage in a hybrid or tiered environment that allows for fast retrieval and response times. Due to the need to withstand high system demand while maintaining high performance, hot data storage systems may be a major business expense.

Conversely, cold data, or cool data, may relate to stored data with a low I/O ratio that has rarely, if ever, been accessed. Since system demands are much lower than those of hot data storage systems, cold data storage systems may have significantly slower retrieval and response times. Typically, cold data storage mediums include tape and low-cost commodity hard disk drives.

SUMMARY

Embodiments of the present invention provide a method, system, and computer program product for allocating storage extents. Extent input/output information pertaining to an extent on a storage device is received, by a computer, where the extant input/output information includes an access rate of data stored on the extent. The computer determines one or more periods of time where the input/output information exceeds a preconfigured threshold. The computer generates one or more of a first policy and a second policy based on the determined one or more periods where the first policy includes allocating the extent to a high performance disk within a tier storage system when data is stored during the determined periods and the second policy includes reallocating the extent from a low performance disk within the tier storage system to a high performance storage device within the tier storage system during the one or more determined periods.

DETAILED DESCRIPTION

Figure 1:
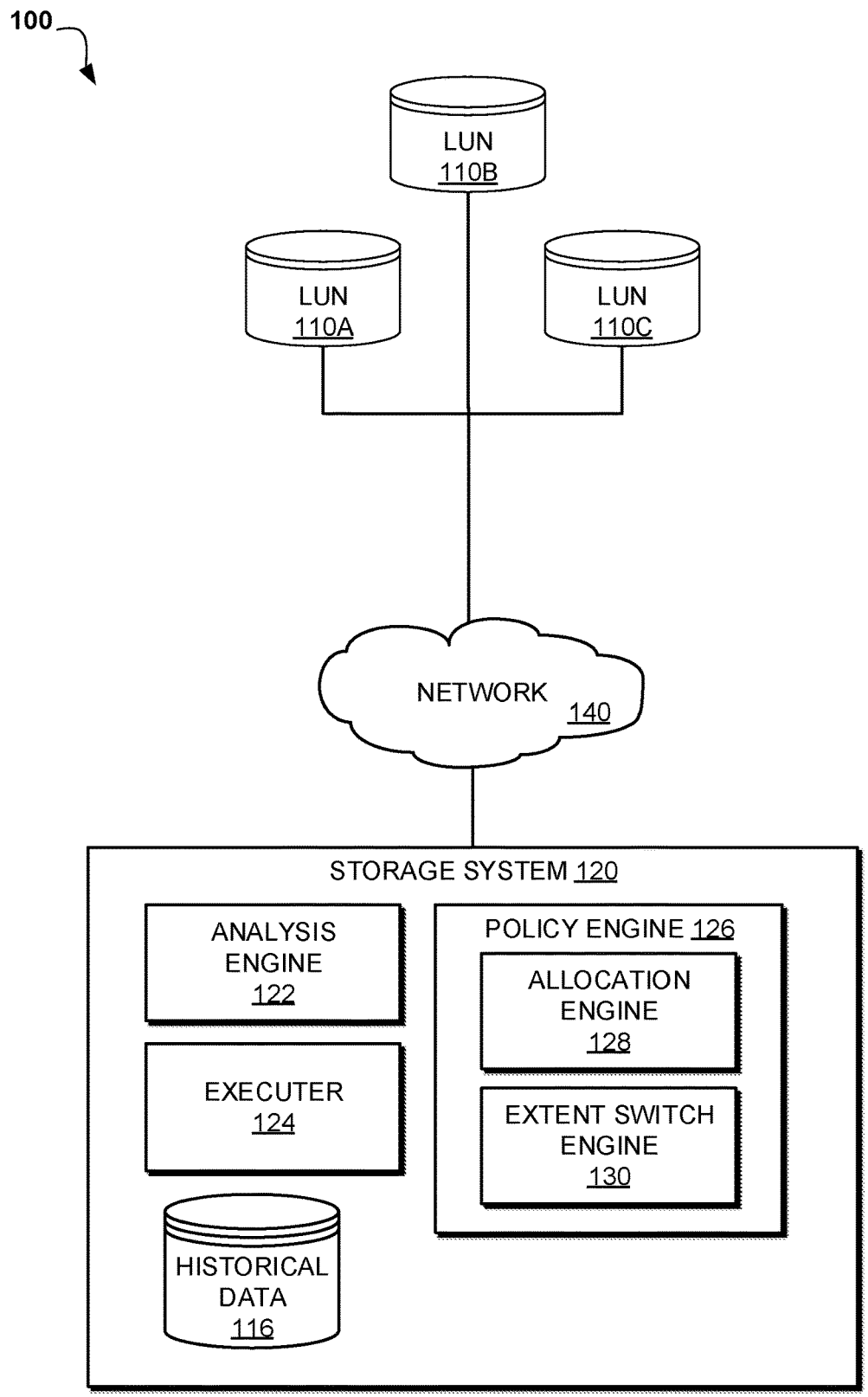
FIG. 1 illustrates an exemplary architecture for an extent storage system, in accordance with one embodiment of the present invention.

Embodiments of the present invention are directed to implementing an extent storage system that predicts extent storage tiers based on historical I/O behavior.

Tier storage may be a typical method of storing data. Tier storage may refer to a method of data storage where data is separated into different levels or tiers based on protection needed, performance requirements, accessibility requirements, and recovery requirements. The type of storage system use in each tier may be determined by the performance capabilities of each type of system. For example, a top tier device may be a solid state disk (SSD) since SSD systems are high performance disks, which may be needed for data that is frequently and quickly accessed. A bottom tier storage device may be a Serial Attached SCSI (SAS) system or a Serial Advanced Technology Attachment (SATA) system since SAS and SATA systems may lower performing but inexpensive, which may be beneficial for storing rarely accessed data. A middle tier storage device may be a subchannel disk with a performance rating and implementation price between top tier and bottom tier devices.

Each file storage system within a tier may include extents. An extent is a range of contiguous space for storage within a file storage system. Each extent within a file storage system may be allocated to a different tier within the tier storage system. For example, an SSD may have three extents where one extent is allocated to tier one, one extent is allocated to tier two, and one extent is allocated to tier three. Data may be moved among extents depending on the category of data and on the tier level of the extent using migration software, such as IBM® Easy Tier® (Easy Tier is a Registered Trademark of IBM Corp.). For example, a computer may initially store data on a low tier storage device. After a period of time, the stored data may be identified as hot data since it is frequently accessed. Since hot data may need to be stored on a high performance system, storing hot data on a low tier storage device may be inefficient. Therefore, hot data may be moved to a top tier storage device. Similarly, cold data may be identified on a top tier storage device. Since storing cold data on a top tier storage device may waste space and the higher performance capabilities of a top tier storage device, the cold data may be moved to a middle tier storage device or a low tier storage device.

Thin provisioning may relate to technology that gives a storage disk the appearance of holding more physical space than the storage disk actually possesses. When saving new data to a thin-provisioned tier storage system, an extent may be allocated at the time of the write request in order to accommodate the new data. However, the tier level of the extent is allocated by default. Since protection, accessibility, performance, and recovery information for the new data may not be available, the new data may be allocated to an extent in an improper tier. For example, if new data is allocated to a low tier storage device but will be accessed shortly after being saved, the new data may be subsequently reallocated to a more appropriate tier.

For a non-thin provisioned storage system, extents are allocated to a tier level when a logical unit number (LUN) is created. A LUN is a virtualized system used to identify a specific logical unit, which may be a portion of a hard disk drive, an entire hard disk drive, or multiple hard disk drives in a storage device. A LUN may be composed of extents from different tiers of hard disks. When a LUN is created in a non-thin provisioned system, the extent tier level may be chosen without guidance on the type of data to be stored on that extent. For example, cold data may be written on expensive, high performance SSD disks while hot data may be written on low performance SATA disks.

Many storage systems experience cyclical time periods of high and low I/O generation. Due to the cyclical nature of I/O data usage, historical data may be utilized to predict future peak periods for hot data and cold data. For example, a stock exchange may generate and analyze large amounts of data during weekday business hours, but little to no data generation and analysis during weekends and holidays. Conversely, online retail vendors may show I/O peaks for goods during weekends or holidays, but significantly lower sales during weekday working hours. By understanding when peak periods of hot data and cold data may occur, data storage systems may be better equipped to more efficiently manage resources. As such, it may be advantageous, among other things, for a tiered storage system to allocate storage extents using historical I/O behavior.

According to one embodiment, extents in a tiered storage system may be pre-allocated into a storage tier for all LUNs within the tiered storage system using analysis of historical I/O data behavior among all tiers. Collected historical I/O data may be analyzed to generate an allocation policy for new space requests on LUNs in thin provisioned systems and an extent switch policy for adjusting the tier level of existing storage extents in non-thin provisioned systems. Periodically, the historical I/O data may be reanalyzed in order to adjust the allocation policy and the extent switch policy to ensure accurateness. Therefore, embodiments of the present invention may have the capacity to improve the technical field of data storage extent allocation by reducing data moves between tiers in a tiered storage system, dynamically and automatically adjusting extent tier assignments in tiered storage systems, and allocating a smart balance of top tier resources between extent switch software, or migration software, and pre-allocation software.

As will be appreciated by one skilled in the art, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed in accordance with the present invention. However, numerous modifications and substitutions can be made without deviating from the scope of the present invention. Therefore, the present invention has been disclosed by way of example and not limitation.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

Embodiments of the present invention will now be described in detail with reference to the accompanying Figures.

FIG. 1 illustrates an exemplary architecture for an extent storage system, in accordance with one embodiment of the present invention. In an exemplary embodiment, extent storage system 100 includes one or more LUNs 110 and storage controller 120 interconnected over a network.

Communication network 140 may include various types of communication networks, such as a wide area network (WAN), local area network (LAN), a telecommunication network, a wireless network, a public switched network and/or a satellite network, and may include connections, such as wire, wireless communication links, or fiber optic cables. In general, communication network 140 can be any combination of connections and protocols that will support communications between LUN 110 and storage system 120, in accordance with embodiments of the invention.

In the exemplary embodiment, LUN 110 may a storage system that includes one or more storage extents from different tiers of backend storage disks. LUNs 110 (LUN A 110A, LUN B 110B, and LUN C 110C) may be created by mapping the one or more storage extents from one or more frontend physical storage disks. LUNs 110 may implement thin provisioning or non-thin provisioning technology for storing data.

In the exemplary embodiment, storage system 120 includes analysis engine 122, executer 124, historical data 116, and policy engine 126. Storage system 120 may be, for example, a laptop computer, tablet computer, netbook computer, personal computer (PC), a desktop computer, a personal digital assistant (PDA), a smart phone, or any type of computing device capable of running a program, accessing a network. While storage system 120 is shown as a single device, in other embodiments, storage system 120 may be comprised of a cluster or plurality of storage systems, working together or working separately. Storage system 120 is described in more detail with reference to FIG. 3.

In the exemplary embodiment, historical data 116 may be previous I/O performance data, such as I/O rates during specific time periods, collected by storage system 120 to determine peak hot data times and cold data across LUNs 110.

In the exemplary embodiment, analysis engine 122 is software that is capable of analyzing the access pattern of historical data 116. For example, if a LUN is accessed 1000 times between 9 a.m. and 10 a.m., analysis engine 122 analyzes the I/O within the LUN for this time period to identify the access pattern so an extent with appropriate performance capabilities can be allocated to store the data during this time period.

In the exemplary embodiment, policy engine 126 is a storage mechanism to host allocation engine 128 and extent switch engine 130. Policy engine 126 is capable of determining whether to initiate allocation engine 128 or extent switch engine 130 based on whether LUN 110 is thin provisioned or non-thin provisioned. If LUN 110 is thin provisioned, policy engine 126 will implement allocation engine 128. If LUN 110 is non-thin provisioned, policy engine 126 will implement extent switch engine 130.

In the exemplary embodiment, allocation engine 128, or pre-allocation software, is software for applying an allocation policy for new extent allocation in thin provisioned LUNs 110. Allocation engine 128 may generate the allocation policy based on historical I/O behavior for all extents created during a policy cycle. Allocation engine 128 may compile monthly historical maximums to determine a relationship between dates, extent creation times, I/O densities and whether data written during the cycle is hot or cold. When applying the allocation policy for thin provisioned LUNs 110, allocation engine 128 may receive a thin provisioned LUN ID and the current time as inputs and produce a target tier in which to create the new extent as an output.

In the exemplary embodiment, extent switch engine 130 is software for applying an extent switch policy for allocating and reallocating extents within non-thin provisioned LUNs 110. Extent switch engine 130 may generate the extent switch policy based on historical I/O behavior for data written to empty extents within a policy cycle. Extent switch engine 130 may compile monthly historical maximums to determine a relationship between dates, extent dirty times, I/O densities and whether data written during the cycle is hot or cold. When applying the extent switch policy for non-thin provisioned LUNs 110, extent switch engine 130 may receive a non-thin provisioned LUN ID and the current time as inputs and produce a target tier and extent numbers to be switched as outputs.

In the exemplary embodiment, executer 124 is software that will apply the allocation policy generated by allocation engine 128 and extent switch policy generated by extent switch engine 130. As previously stated, executer 124 will decide whether to apply the allocation policy or the extent switch policy based on whether a LUN within LUNs 110 is thin provisioned or non-thin provisioned.

Figure 2:
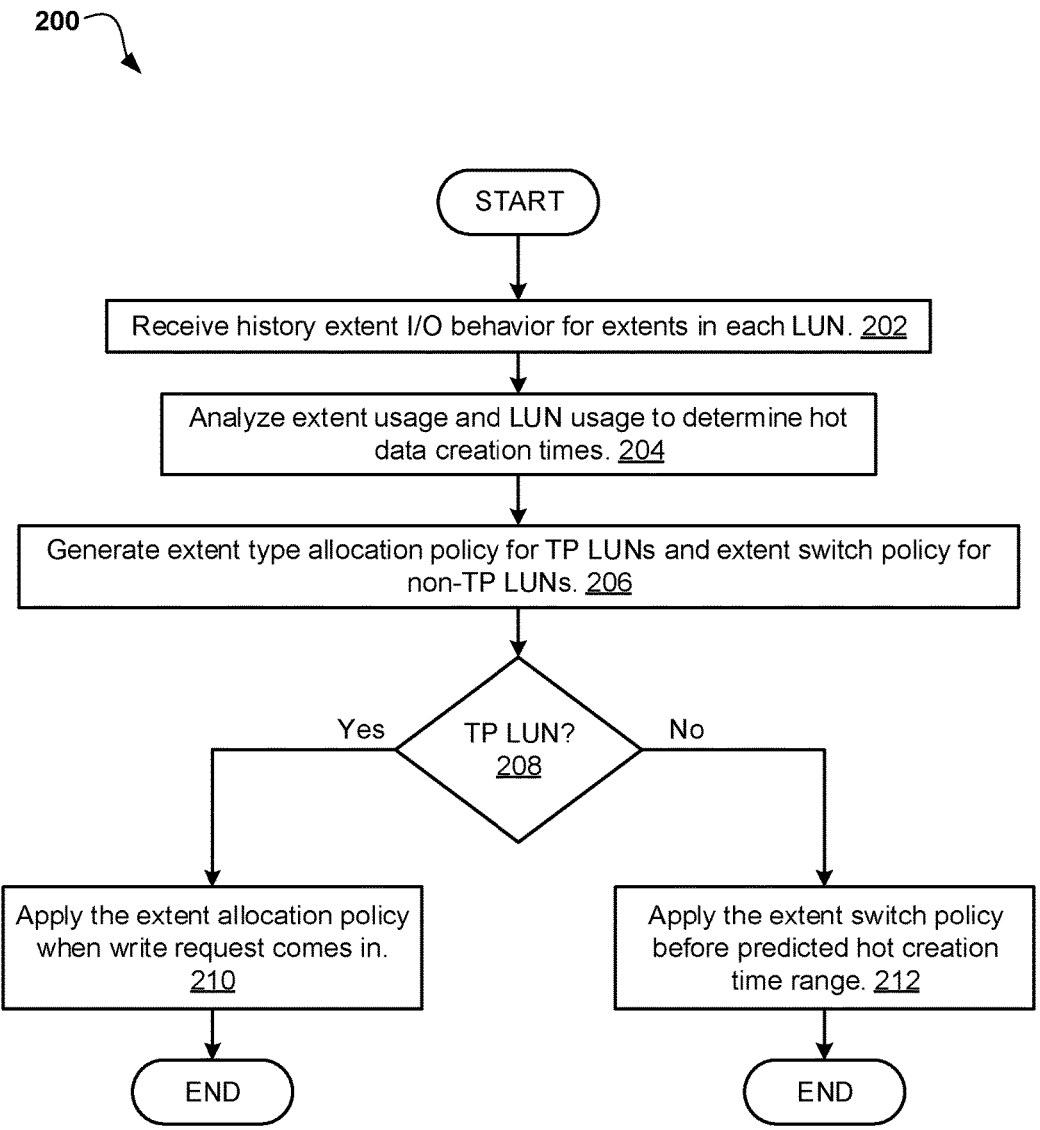
FIG. 2 is an operational flowchart illustrating the steps carried out by the extent storage system of FIG. 1, in accordance with one embodiment of the present invention.

Referring now to FIG. 2, an operational flowchart illustrating the steps carried out by the extent storage system of FIG. 1 is depicted, in accordance with one embodiment of the present invention. In the exemplary embodiment, storage system 120 may record historical extent I/O behavioral data, or extent information, for each extent within LUNs 110 (step 202). When I/O data is recorded in storage system 120 from a LUN within LUNs 110, storage system 120 may store the received I/O data as historical data 116. The recorded I/O data may be collected for a policy cycle. A policy cycle may be a predefined time frame that may be separated into predefined time intervals. For example, if storage system 120 collects I/O on a daily basis and separates the collected data into five minute time intervals, I/O behavior data will be collected for a Monday, separated into five minute intervals, such as 9:00 a.m. to 9:05 a.m., and stored in historical data 116. When recording historical extent I/O behavior data, each storage system 120 connected to LUNs 110 may create a list of effective LUNs within LUNs 110 for that storage system 120. The list of effective LUNs within LUNs 110 may be carried over from one policy cycle to a successive policy cycle so a record of all effective LUNs connected to each storage system 120 may be maintained. An effective LUN may be a LUN within LUNs 110 created or accessed during the policy cycle. For each effective LUN within LUNs 110 tracked by storage system 120, an extent list of all effective extents may be created to track the effective extents during the policy cycle. An effective extent may be extents created or accessed within the policy cycle. The recorded historical I/O behavior data may include the I/O per second (TOPS) for each extent, read/write rate for each extent, sequential/random rate for each extent, and the cumulative, or sum, I/O behavior for each policy cycle. Storage system 120 may create a I/O behavior summary for each policy cycle.

The storage system 120 then analyzes the extent usage and LUN usage, using analysis engine 122 and historical data 116, to determine when hot data is created and when cold data is created (step 204). Analysis engine 122 may review the I/O behavior summary for each policy cycle to determine hot creation time ranges for each extent in a LUN within LUNs 110. A hot creation time range may be series consecutive time intervals that experience I/O impact above a preconfigured threshold, such as 2,000 instances of access to the stored data. Analysis engine 122 may calculate I/O impact for each time interval in a policy cycle by analyzing the collected I/O behavior for each extent stored within historical data 116. The I/O impact may be determined by calculating total I/O occurrences over a time interval multiplied by the I/O behavior weight. The I/O behavior weight is based on when the newly created extent is first accessed after the extent is created. For example, if a policy cycle has five minute time periods, the total I/O occurrences for the time period between 9:00 a.m. and 9:05 a.m. is 2,000, and the policy cycle is give a numerical weight of five units since the policy cycle started at 9:00 a.m., the I/O impact would be calculated as 2,000 occurrences multiplied by the weight of five units to equal a total I/O impact of 10,000 occurrences. The I/O behavior weight may be greater for newly created extents first accessed closely after the extent is created. Conversely, the I/O behavior weight may be less for newly created extents first accessed longer after the extent is created.

Once the I/O impact is calculated for each extent time interval, the total I/O impact for all extents within a LUN of LUNs 110 may be calculated to determine the hot creation time intervals. As previously described, a time interval may be identified as a hot creation time interval when the calculated I/O impact is greater than a preconfigured hot data threshold. For example, the hot data threshold for an extent may be preconfigured at 2,000 I/O accesses over a five minute time interval. If a time interval over the extent displays an I/O impact of 2,000 accesses, the time interval may be identified as a hot creation time interval. The hot creation time intervals may be grouped into hot creation time ranges. For example, if three consecutive time intervals, such as 9:00 a.m. to 9:05 a.m., 9:05 a.m. to 9:10 a.m., and 9:10 a.m. to 9:15 a.m., are all classified as hot creation time intervals, the combination of these consecutive time intervals may be classified as a hot creation time range.

Once analysis engine 122 has determined the I/O impact results for all extents in a LUN within LUNs 110 during a policy cycle, the I/O impact results for the policy cycle may be compared to the I/O impact results of previous policy cycles to determine cyclical time intervals where I/O impact exceeds the preconfigured hot data threshold. For example, if analysis engine 122 determines a hot creation time range exists on a Monday from 9:00 a.m. to 9:15 a.m., policy engine 126 will compare the hot data time range to previous hot creation time ranges that occur on Mondays. If policy engine 126 determines the LUN within LUNs 110 experiences hot creation time intervals on Mondays between 9:00 a.m. and 9:15 a.m., policy engine 126 may configure the LUN within LUNs 110 to use high performance extents on Mondays from 9:00 a.m. to 9:15 a.m.

Storage system 120, using the analyzed I/O impact for all extents in a LUN within LUNs 110 and policy engine 126, may generate a policy for switching extents or allocating extents based on the cyclical hot creation time ranges and whether the LUN within LUNs 110 is thin provisioned or non-thin provisioned (step 206). Extents in thin provisioned LUNs may be allocated when the extents are needed rather than when the LUN is created. Therefore, when new extents are requested in a thin provisioned LUN, an extent allocation policy may allocate an extent for storage of the newly created data. The extent allocation policy may be generated using extent allocation engine 128. The extent allocation policy may be written to accommodate new extent requests received during hot creation time ranges. Therefore, new extent requests received during a cyclical hot creation time range to be allocated to a high performance extent. New extent requests received outside of a hot creation time range may be allocated to mid-performance or low performance extents. For example, if Mondays between 9:00 a.m. and 9:15 a.m. is a hot creation time range, the allocation policy may be written so that all new extent requests received during this time period will receive high performance extent allocations and all new extent requests received outside this time period will receive mid-performance or low performance extent allocations.

Extents in non-thin provisioned LUNs may be allocated when the LUN is created rather than when the extents are needed. Therefore, an extent switch policy may be applied to switch data to empty extents in lower tiers when high performance extents in top tiers are needed during hot creation time ranges. Using the cyclical I/O impact results, the extent switch policy may be written to predict how many empty extents in top tiers will be needed to accommodate new data during a hot creation time range. Prior to the beginning of the hot creation time data, the extent switch policy may move cold data from the top tiers to lower tiers in order to allow enough empty extents to accommodate the new data. Data from top tier extents to lower tier extents accordingly.

Contesting for resources between storage units within a tier may occur since resources may be limited in a disk drive, such as a solid state drive. For example, the extent allocation engine 128 and the extent switch engine 130 may be operating concurrently and may vie for system resources. Therefore, top tier resources may be balanced between the extent allocation engine 128 and extent switch engine 130. Using a hit ratio, a proper distribution of resources between the extent allocation engine 128 and extent switch engine 130 may be achieved. A hit ratio is the percentage of memory accesses satisfied by a cache. Therefore, the number of times each engine accesses the extent may determine the hit ratio for that particular engine. Once the hit ratio for the allocation engine 128 and the extent switch engine 130 are determined, a top tier resource usage percentage for each engine may be calculated. The top tier resource usage percentage may be the percentage of the total memory accesses for an extent that are attributed to a particular engine. For example, if there are a total of 1,000 memory accesses to an extent during a time interval and 600 of the memory accesses are attributed to the extent allocation engine 128, the top tier resource usage percentage for the allocation engine 128 is 60%. The top tier resource usage percentage may be preconfigured to not exceed a top tier resource maximum usage percentage. The top tier resource maximum usage percentage may be the highest preconfigured percentage of resources that may be allocated to an engine. For example, if the top tier resource usage maximum percentage is preconfigured to 60% and an extent has 1,000 total memory accesses, the allocation engine 128 will not be permitted to exceed 600 memory accesses during a time interval in order to properly allocation resources according to the preconfigured top tier resource maximum usage percentage.

If storage system 120 determines that a LUN within LUNs 110 is thin provisioned (step 208, "YES" branch), storage system 120 may apply the generated extent allocation policy when new extent write data is received by storage system 120 (step 210). As previously described, thin provisioned LUNs allocate extents when the extents are needed rather than when the LUN within LUNs 110 is created. Therefore, thin provisioned LUNs may implement the allocation policy to allocate an extent for storage of the newly created data.

If storage system 120 determines that a LUN within LUNs 110 is non-thin provisioned (step 208, "NO" branch), storage system 120 may apply the generated extent switch policy prior the predicted hot creation time range (step 212). As previously described, non-thin provisioned LUNs allocate extents to a storage tier when created rather than when a new data is received. Therefore, non-thin provisioned LUNs may implement the extent switch policy to move extents to lower tiers within LUNs 110 prior to the start of the hot creation time range. The extent switch policy may be applied to ensure adequate empty extents are present in top tiers to accommodate new data received during the hot creation time range.

Figure 3:
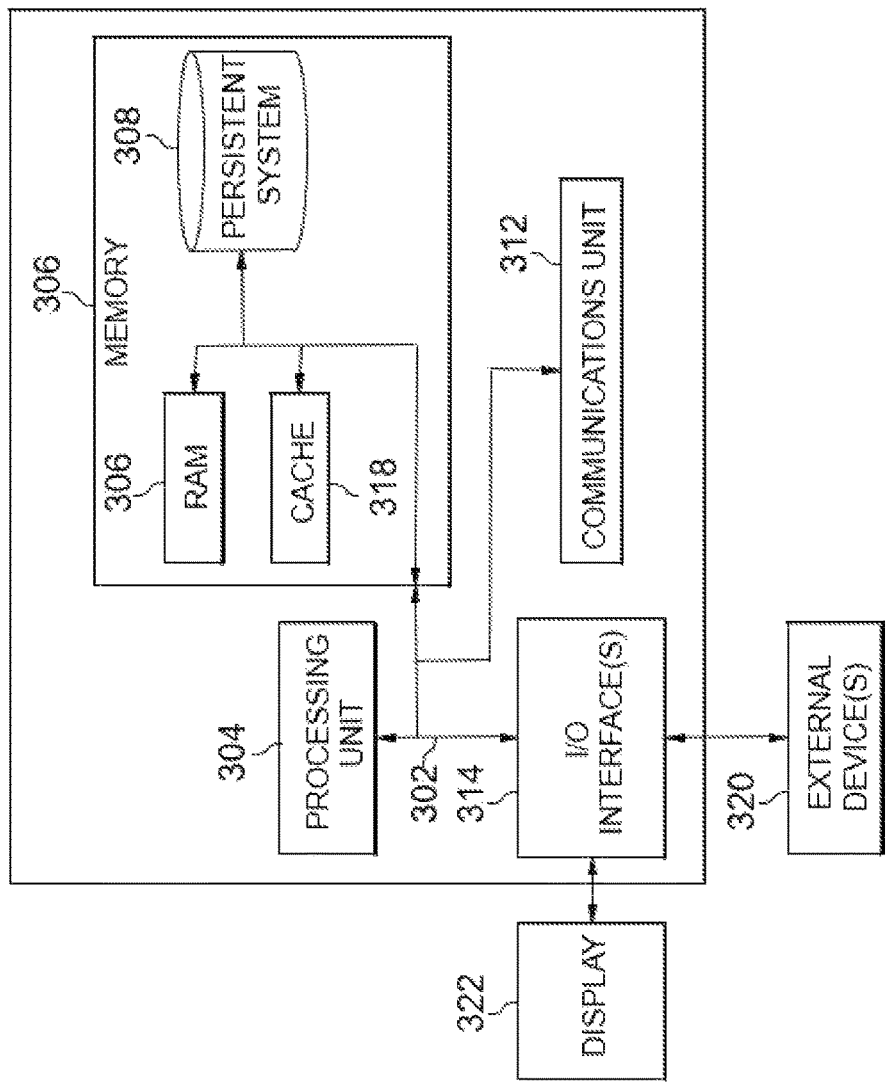
FIG. 3 is a block diagram depicting the hardware components of the extent storage system of FIG. 1, in accordance with an embodiment of the invention.

FIG. 3 depicts a block diagram of components of storage system 120 in accordance with an illustrative embodiment of the present invention. It should be appreciated that FIG. 3 provides only an illustration of one implementation and does not imply any limitations with regard to the environments in which different embodiments may be implemented. Many modifications to the environment may be made.

Storage system 120 includes communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

Analysis engine 122, executer 124, policy engine 126 and historical data 116 in storage system 120 are stored in persistent storage 308 for execution and access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. Analysis engine 122, executer 124, policy engine 126 and historical data 116 in storage system 120 may be downloaded to persistent storage 308 through communications unit 312.

I/O interface(s) 314 allows for input and output of data with other devices that may be connected to storage system 120. For example, I/O interface(s) 314 may provide a connection to external device(s) 320 such as a keyboard, keypad, a touch screen, and/or some other suitable input device. External device(s) 320 can also include portable computer-readable storage media such as, for example, thumb drives, portable optical or magnetic disks, and memory cards. Software and data used to practice embodiments of the present invention, i.e., analysis engine 122, executer 124, policy engine 126 and historical data 116, can be stored on such portable computer-readable storage media and can be loaded onto persistent storage 308 via I/O interface(s) 314. I/O interface(s) 314 can also connect to a display 322.

Display 322 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for allocating storage extents, the method comprising:
   determining, by the computer, one or more periods of time where input/output information of a storage extent exceeds a preconfigured threshold; and
   generating, by the computer, one or more of a first policy and a second policy based on the determined one or more periods wherein the first policy includes allocating the extent to a high performance storage device within a tier storage system when data is stored during the one or more determined periods and the second policy includes reallocating the extent from a low performance storage device within the tier storage system to a high performance storage device within the tier storage system during the one or more determined periods, and wherein an allocation engine is used to generate one or more of the first policy and the second policy for a thin provisioned storage system, and wherein an extent switch engine is used to generate one or more of the first policy and second policy for a non-thin provisioned storage system, and wherein the allocation engine compiles a plurality of monthly historical maximums to determine a relationship between two or more dates, a plurality of extent creation times, a plurality of input/output densities, and whether a plurality of data written during a cycle is hot or cold, and wherein the extent switch engine complies a plurality of monthly historical maximums to determine a relationship between two or more dates, one or more extent dirty times, a plurality of input/output densities, and whether a plurality of data written during a cycle is hot or cold.

2. The method of claim 1, further comprising:
   based on determining the storage device is thin provisioned, executing the first policy; and
   based on determining the storage device is not thin provisioned, executing the second policy.

3. The method of claim 1, wherein generating the first policy includes a user assigning a first maximum resource usage percentage associated with one or more storage devices on the computer wherein the first maximum resource usage percentage equals a first policy hit ratio divided by a sum of the first policy hit ratio and a second policy hit ratio, and wherein the first policy hit ratio equals a first data search hit total of the one or more storage devices associated with the first policy divided by a first total data accesses of the one or more storage devices associated with the first policy, and wherein the second policy hit ratio equals a second data search hit total of the one or more storage devices associated with the second policy divided by a second total data accesses of the one or more storage devices associated with the second policy.

4. The method of claim 1, wherein generating the second policy includes a user assigning a second maximum resource usage percentage associated with the one or more storage devices on the computer wherein the second maximum resource usage percentage equals the second policy hit ratio divided by the sum of the first policy hit ratio and the second policy hit ratio, and wherein the first policy hit ratio equals a first data search hit total of the one or more storage devices associated with the first policy divided by a first total data accesses of the one or more storage devices associated with the first policy, and wherein the second policy hit ratio equals a second data search hit total of the one or more storage devices associated with the second policy divided by a second total data accesses of the one or more storage devices associated with the second policy.

5. The method of claim 1, wherein the input/output information further includes a read rate for the extent, a write rate for the extent, a sequential rate for the extent, a random rate for the extent, and total input/output accesses for the extent during a time period.

6. The method of claim 1, wherein determining one or more periods of time further comprises determining an input/output impact on the extent during a time interval within the one or more determined time periods, and wherein the input/output impact is determined by multiplying total input/output occurrences during the time interval by an input/output weight, and wherein the input/output weight is based on a proximity in time between a first data stored on the extent and a first access of the data stored on the extent.

7. The method of claim 2, wherein executing the first policy and executing the second policy occurs prior to the one or more determined periods.

8. A computer system for allocating storage extents, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   determining, by the computer, one or more periods of time where input/output information of a storage extent exceeds a preconfigured threshold; and
   generating, by the computer, one or more of a first policy and a second policy based on the determined one or more periods wherein the first policy includes allocating the extent to a high performance storage device within a tier storage system when data is stored during the one or more determined periods and the second policy includes reallocating the extent from a low performance storage device within the tier storage system to a high performance storage device within the tier storage system during the one or more determined periods, and wherein an allocation engine is used to generate one or more of the first policy and the second policy for a thin provisioned storage system, and wherein an extent switch engine is used to generate one or more of the first policy and second policy for a non-thin provisioned storage system, and wherein the allocation engine compiles a plurality of monthly historical maximums to determine a relationship between two or more dates, a plurality of extent creation times, a plurality of input/output densities, and whether a plurality of data written during a cycle is hot or cold, and wherein the extent switch engine complies a plurality of monthly historical maximums to determine a relationship between two or more dates, one or more extent dirty times, a plurality of input/output densities, and whether a plurality of data written during a cycle is hot or cold.

9. The computer system of claim 8, further comprising:
based on determining the storage device is thin provisioned, executing the first policy; and
based on determining the storage device is not thin provisioned, executing the second policy.

10. The computer system of claim 8, wherein generating the first policy includes a user assigning a first maximum resource usage percentage associated with one or more storage devices on the computer wherein the first maximum resource usage percentage equals a first policy hit ratio divided by a sum of the first policy hit ratio and a second policy hit ratio, and wherein the first policy hit ratio equals a first data search hit total of the one or more storage devices associated with the first policy divided by a first total data accesses of the one or more storage devices associated with the first policy, and wherein the second policy hit ratio equals a second data search hit total of the one or more storage devices associated with the second policy divided by a second total data accesses of the one or more storage devices associated with the second policy.

11. The computer system of claim 8, wherein generating the second policy includes a user assigning a second maximum resource usage percentage associated with the one or more storage devices on the computer wherein the second maximum resource usage percentage equals the second policy hit ratio divided by the sum of the first policy hit ratio and the second policy hit ratio, and wherein the first policy hit ratio equals a first data search hit total of the one or more storage devices associated with the first policy divided by a first total data accesses of the one or more storage devices associated with the first policy, and wherein the second policy hit ratio equals a second data search hit total of the one or more storage devices associated with the second policy divided by a second total data accesses of the one or more storage devices associated with the second policy.

12. The computer system of claim 8, wherein the input/output information further includes a read rate for the extent, a write rate for the extent, a sequential rate for the extent, a random rate for the extent, and total input/output accesses for the extent during a time period.

13. The computer system of claim 8, wherein determining one or more periods of time further comprises determining an input/output impact on the extent during a time interval within the one or more determined time periods, and wherein the input/output impact is determined by multiplying total input/output occurrences during the time interval by an input/output weight, and wherein the input/output weight is based on a proximity in time between a first data stored on the extent and a first access of the data stored on the extent.

14. The computer system of claim 9, wherein executing the first policy and executing the second policy occurs prior to the one or more determined periods.

15. A computer program product for allocating storage extents the computer program product comprising:
one or more computer-readable tangible storage medium and program instructions stored on at least one of the one or more tangible storage medium, the program instructions executable by a processor that is capable of performing a method, the method comprising:
determining, by the computer, one or more periods of time where the input/output information of a storage extent exceeds a preconfigured threshold; and
generating one or more of a first policy and a second policy based on the determined one or more periods wherein the first policy includes allocating the extent to a high performance storage device within a tier storage system when data is stored during the one or more determined periods and the second policy includes reallocating the extent from a low performance storage device within the tier storage system to a high performance storage device within the tier storage system during the one or more determined periods, and wherein an allocation engine is used to generate one or more of the first policy and the second policy for a thin provisioned storage system, and wherein an extent switch engine is used to generate one or more of the first policy and second policy for a non-thin provisioned storage system, and wherein the allocation engine compiles a plurality of monthly historical maximums to determine a relationship between two or more dates, a plurality of extent creation times, a plurality of input/output densities, and whether a plurality of data written during a cycle is hot or cold, and wherein the extent switch engine complies a plurality of monthly historical maximums to determine a relationship between two or more dates, one or more extent dirty times, a plurality of input/output densities, and whether a plurality of data written during a cycle is hot or cold.

16. The computer program product of claim 15, further comprising:
based on determining the storage device is thin provisioned, executing the first policy; and
based on determining the storage device is not thin provisioned, executing the second policy.

17. The computer program product of claim 15, wherein generating the first policy includes a user assigning a first maximum resource usage percentage associated with one or more storage devices on the computer wherein the first maximum resource usage percentage equals a first policy hit ratio divided by a sum of the first policy hit ratio and a second policy hit ratio, and wherein the first policy hit ratio equals a first data search hit total of the one or more storage devices associated with the first policy divided by a first total data accesses of the one or more storage devices associated with the first policy, and wherein the second policy hit ratio equals a second data search hit total of the one or more storage devices associated with the second policy divided by a second total data accesses of the one or more storage devices associated with the second policy.

18. The computer program product of claim 15, wherein generating the second policy includes a user assigning a second maximum resource usage percentage associated with the one or more storage devices on the computer wherein the second maximum resource usage percentage equals the second policy hit ratio divided by the sum of the first policy hit ratio and the second policy hit ratio, and wherein the first policy hit ratio equals a first data search hit total of the one or more storage devices associated with the first policy divided by a first total data accesses of the one or more storage devices associated with the first policy, and wherein the second policy hit ratio equals a second data search hit total of the one or more storage devices associated with the second policy divided by a second total data accesses of the one or more storage devices associated with the second policy.

19. The computer program product of claim 15, wherein the input/output information further includes a read rate for the extent, a write rate for the extent, a sequential rate for the extent, a random rate for the extent, and total input/output accesses for the extent during a time period.

20. The computer program product of claim 15, wherein determining one or more periods of time further comprises determining an input/output impact on the extent during a time interval within the one or more determined time periods, and wherein the input/output impact is determined by multiplying total input/output occurrences during the time interval by an input/output weight, and wherein the input/output weight is based on a proximity in time between a first data stored on the extent and a first access of the data stored on the extent.

* * * * *